US011909826B1

(12) United States Patent
May

(10) Patent No.: US 11,909,826 B1
(45) Date of Patent: Feb. 20, 2024

(54) SYSTEMS AND METHODS FOR FOUR DIMENSIONAL NETWORK SESSION AUTHORIZATION

(71) Applicant: Fortinet, Inc., Sunnyvale, CA (US)

(72) Inventor: Robert A. May, Burnaby (CA)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 17/980,246

(22) Filed: Nov. 3, 2022

(51) Int. Cl.
*H04L 29/06* (2006.01)
*H04L 12/26* (2006.01)
*H04L 67/141* (2022.01)
*H04L 9/40* (2022.01)
*H04L 43/062* (2022.01)
*H04L 67/146* (2022.01)

(52) U.S. Cl.
CPC .......... *H04L 67/141* (2013.01); *H04L 43/062* (2013.01); *H04L 63/20* (2013.01); *H04L 67/146* (2013.01)

(58) Field of Classification Search
CPC ... H04L 67/141; H04L 67/146; H04L 43/062; H04L 63/20
USPC ........................................................ 709/227
See application file for complete search history.

(56) References Cited

U.S. PATENT DOCUMENTS

| 10,320,813 | B1* | 6/2019 | Ahmed ............... H04L 63/1416 |
| 2006/0026682 | A1* | 2/2006 | Zakas ...................... H04L 9/40 726/22 |
| 2016/0006661 | A1* | 1/2016 | Wei ..................... H04L 47/2483 370/230 |
| 2018/0103010 | A1* | 4/2018 | Diaz Cuellar ...... H04L 63/0263 |
| 2020/0014615 | A1* | 1/2020 | Michael ............. H04L 43/0864 |
| 2020/0296026 | A1* | 9/2020 | Michael .................. H04L 43/08 |
| 2020/0382537 | A1* | 12/2020 | Compton ............ H04L 63/1408 |
| 2021/0281576 | A1 | 9/2021 | Sharavan |
| 2022/0029988 | A1 | 1/2022 | Levin |
| 2022/0329565 | A1* | 10/2022 | Jiang .................. H04L 63/1425 |
| 2022/0345491 | A1 | 10/2022 | Luo |

FOREIGN PATENT DOCUMENTS

WO WO-2012164336 A1 * 12/2012 ........... G06F 21/552

OTHER PUBLICATIONS

U.S. Appl. No. 17/958,616, filed Oct. 3, 2022, Burnaby.
U.S. Appl. No. 17/980,246, filed Nov. 3, 2022, Burnaby.
U.S. Appl. No. 17/958,608, filed Oct. 27, 2022, Burnaby.

* cited by examiner

*Primary Examiner* — Ruolei Zong
(74) *Attorney, Agent, or Firm* — Jaffery Watson Mendonsa & Hamilton LLP

(57) ABSTRACT

Various embodiments provide systems and methods for automatically defining and enforcing network sessions based upon at least four dimensions of segmentation.

20 Claims, 4 Drawing Sheets

(12) United States Patent
US 11,909,826 B1

SYSTEMS AND METHODS FOR FOUR DIMENSIONAL NETWORK SESSION AUTHORIZATION

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2022, Fortinet, Inc.

FIELD

Embodiments discussed generally relate to systems and methods for policing network activities, and more particularly to systems and methods for automatically defining and enforcing network sessions based upon at least four dimensions of segmentation.

BACKGROUND

In a typical firewall implementation, a system administrator identifies one or more universal record locators (URLs) that are prohibited and one or more URLs that are explicitly allowed. In operation when someone either tries to access a prohibited URL from inside a network protected by the firewall or an access to the protected network from a prohibited URL, the network session is blocked. Similarly, accesses to/from an explicitly allowed URL are always allowed. Other unclassified URLs may or may not be accessible depending upon dynamic decisions and changes in the firewall. Such an approach, while effective, is often easily avoided by hackers and is prone to becoming out of date.

Hence, there exists a need in the art for advanced approaches for automatically defining and enforcing network sessions.

SUMMARY

Various embodiments provide systems and methods for automatically defining and enforcing network sessions based upon at least four dimensions of segmentation.

This summary provides only a general outline of some embodiments. Many other objects, features, advantages, and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

DETAILED DESCRIPTION

Figure 1A:
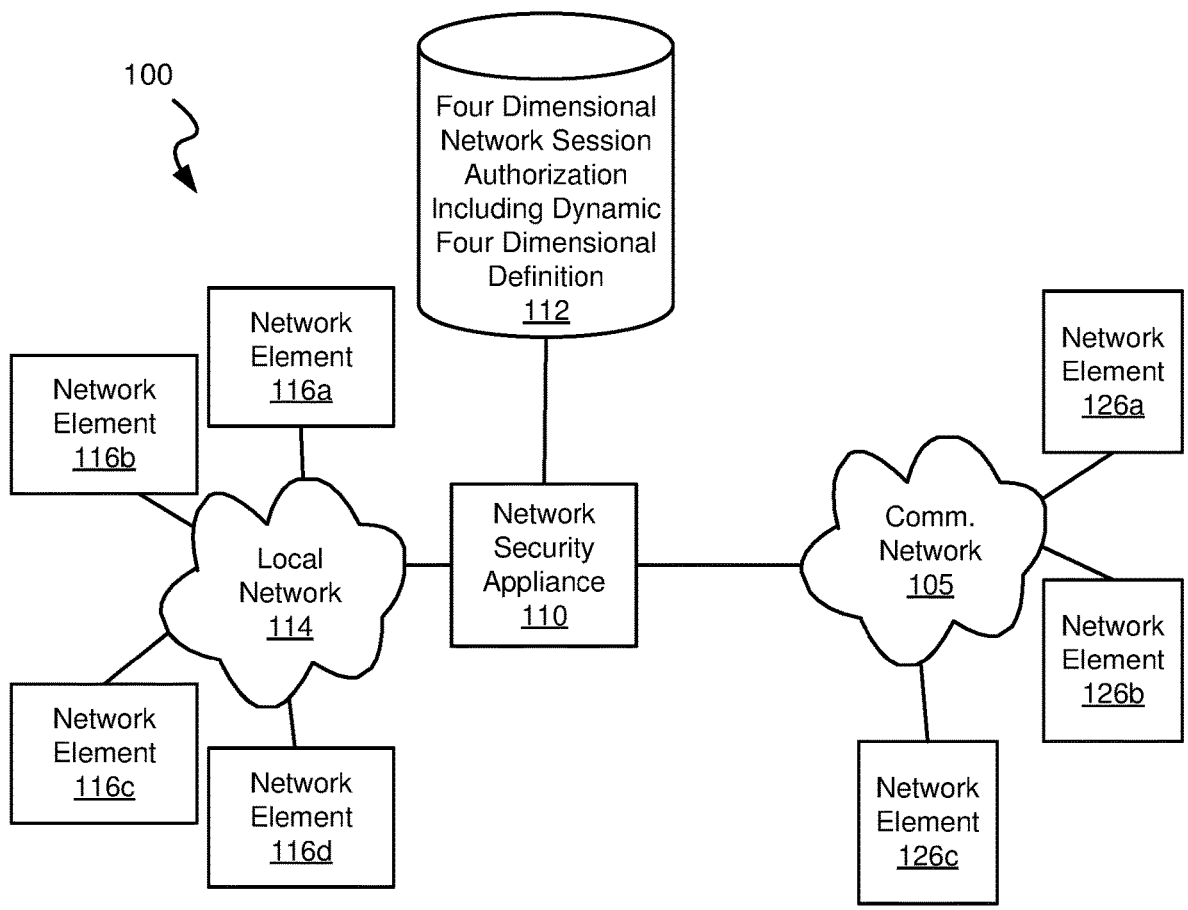
FIGS. 1A-1C illustrate a network architecture including a four dimensional network session authorization control application including dynamic four dimensional definition control in accordance with some embodiments.

Various embodiments provide systems and methods for automatically defining and enforcing network sessions based upon at least four dimensions of segmentation.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network appliance", a "network element", or a "network device" generally refers to a device or appliance in virtual or physical form that is operable to perform one or more network functions. In some cases, a network appliance may be a database, a network server, or the like. Some network devices may be implemented as general-purpose computers or servers with appropriate software operable to perform the one or more network functions. Other network devices may also include custom hardware (e.g., one or more custom Application-Specific Integrated Circuits (ASICs)). Based upon the disclosure provided herein, one of ordinary skill in the art will recognize a variety of network appliances that may be used in relation to different embodiments. In some cases, a network appliance may be a "network security appliance" or a network security device" that may reside within the particular network that it is protecting, or network security may be provided as a service with the network security device residing in the cloud. For example, while there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DoS attack detection and mitigation appliances).

As used herein, the phrases "network path", "communication path", or "network communication path" generally refer to a path whereby information may be sent from one end and received on the other. In some embodiments, such paths are referred to commonly as tunnels which are configured and provisioned as is known in the art. Such paths may traverse, but are not limited to traversing, wired or wireless communication links, wide area network (WAN) communication links, local area network (LAN) communication links, and/or combinations of the aforementioned. Based upon the disclosure provided herein, one of ordinary skill in the art will recognize a variety of communication paths and/or combinations of communication paths that may be used in relation to different embodiments.

The phrase "processing resource" is used in its broadest sense to mean one or more processors capable of executing instructions. Such processors may be distributed within a network environment or may be co-located within a single network appliance. Based upon the disclosure provided herein, one of ordinary skill in the art will recognize a variety of processing resources that may be used in relation to different embodiments.

The phrase "network accessible service" "or "network accessible process" may be any service or process accessible via a communication network. As an example, a network accessible service may be an audio communication and/or video communication service such as, for example, Zoom™ that allows two or more end users to communicate over a communication network. As another example, a network accessible service may be a word processing service such as, for example, Office365™. Based upon the disclosure provided herein, one of ordinary skill in the art will recognize a variety of network accessible services and/or network accessible processes that may be used in relation to different embodiments.

The phrase "four dimensional network session definition" is used in its broadest sense to mean four elements of information assembled in a defined order to define a particular network session. As an example, a four dimensional network session definition may be:

{{Source, Destination, Port, Protocol} }.

Based upon the disclosure provided herein, one of ordinary skill in the art will recognize a variety of combinations of four network communication traffic information that may be used in a four dimensional network session definition. Further, based upon the disclosure provided herein, one of ordinary skill in the art will recognize that the aforementioned source information, destination information, port information, and protocol information may be combined in a different order to yield a four dimensional network session definition.

Example embodiments will now be described more fully hereinafter with reference to the accompanying drawings, in which exemplary embodiments are shown. This disclosure may, however, be embodied in many different forms and should not be construed as limited to the embodiments set forth herein. It will be appreciated by those of ordinary skill in the art that the diagrams, schematics, illustrations, and the like represent conceptual views of processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Some embodiments provide methods for automatically applying network communication policies. Such methods include: receiving, by a processing resource, a four dimensional network session definition representing a network transaction; determining, by the processing resource, that the four dimensional network session definition matches a previously classified four dimensional network session definition included in a set of four dimensional network session definition matches and corresponding classifications, where the previously classified four dimensional network session definition indicates a process to be applied to the network transaction; and applying the process to the network transaction.

In some instances of the aforementioned embodiments, the four dimensional network session definition includes: a source, a destination, a port, and a protocol. In various instances of the aforementioned embodiments, the four dimensional network session definition includes: a source, a destination, a port, and a protocol in order of the source, the destination, the port, and the protocol. In some instances of the aforementioned embodiments, the methods further include: monitoring, by the processing resource, ongoing network traffic to yield a plurality of individual network traffics; and extracting, by the processing resource, the four dimensional network session definition from one of the plurality of individual network traffics.

In various instances of the aforementioned embodiments, the methods further include: monitoring, by the processing resource, ongoing network traffic to yield a plurality of individual network traffics; extracting, by the processing resource, a plurality of four dimensional network session definitions each corresponding to a respective one of the plurality of individual network traffics; classifying, by the processing resource, at least one of the plurality of four dimensional network session definitions to yield the previously classified four dimensional network session definition. In some such instances, the methods further include: receiving, by the processing resource, a plurality of four dimensional network session definitions and corresponding classifications from a third party service; and combining, by the processing resource, the plurality of four dimensional network session definitions received from the third party service with the previously classified four dimensional network session definition to yield the set of four dimensional network session definition matches and corresponding classifications.

In some instances of the aforementioned embodiments, the method further includes receiving, by the processing resource, a plurality of four dimensional network session definitions and corresponding classifications. In various instances of the aforementioned embodiments, the processing resource is included in a network security appliance deployed to provide network security services for a communication network. In some instances of the aforementioned embodiments, the process is either blocking the network transaction, or allowing the network transaction.

Other embodiments provide systems for automatically applying network communication policies. Such systems include a processing resource, and a non-transient computer readable medium coupled to the processing resource. The non-transient computer readable medium has stored therein instructions that when executed by the processing resource cause the processing resource to: receive a four dimensional network session definition representing a network transaction; determine that the four dimensional network session definition matches a previously classified four dimensional network session definition included in a set of four dimensional network session definition matches and corresponding classifications, where the previously classified four dimensional network session definition indicates a process to be applied to the network transaction; and apply the process to the network transaction.

In some instances of the aforementioned embodiments, the four dimensional network session definition includes: a source, a destination, a port, and a protocol. In various instances of the aforementioned embodiments, the four dimensional network session definition includes: a source, a destination, a port, and a protocol in order of the source, the destination, the port, and the protocol.

In various instances of the aforementioned embodiments, the non-transient computer readable medium further has stored therein instructions that when executed by the processing resource cause the processing resource to: monitor ongoing network traffic to yield a plurality of individual network traffics; and extract the four dimensional network session definition from one of the plurality of individual network traffics. In some instances of the aforementioned embodiments, the non-transient computer readable medium further has stored therein instructions that when executed by the processing resource cause the processing resource to: monitor ongoing network traffic to yield a plurality of individual network traffics; extract a plurality of four dimensional network session definitions each corresponding to a respective one of the plurality of individual network traffics; classify at least one of the plurality of four dimensional network session definitions to yield the previously classified four dimensional network session definition. In some such instances, the non-transient computer readable medium further has stored therein instructions that when executed by the processing resource cause the processing resource to: receive a plurality of four dimensional network session definitions and corresponding classifications from a third party service; and combine the plurality of four dimensional network session definitions received from the third party service with the previously classified four dimensional network session definition to yield the set of four dimensional network session definition matches and corresponding classifications.

In various instances of the aforementioned embodiments, the non-transient computer readable medium further has stored therein instructions that when executed by the processing resource cause the processing resource to receive a plurality of four dimensional network session definitions and corresponding classifications. In some instances of the aforementioned embodiments, the processing resource is included in a network security appliance deployed to provide network security services for a communication network. In various instances of the aforementioned embodiments, the process is selected from a group consisting of: blocking the network transaction, and allowing the network transaction.

Yet other embodiments provide non-transient computer readable media having stored therein instructions that when executed by the processing resource cause the processing resource to: receive a four dimensional network session definition representing a network transaction; determine that the four dimensional network session definition matches a previously classified four dimensional network session definition included in a set of four dimensional network session definition matches and corresponding classifications, where the previously classified four dimensional network session definition indicates a process to be applied to the network transaction; and apply the process to the network transaction.

In some instances of the aforementioned embodiments, the four dimensional network session definition includes: a source, a destination, a port, and a protocol. In various instances of the aforementioned embodiments, the four dimensional network session definition includes: a source, a destination, a port, and a protocol in order of the source, the destination, the port, and the protocol.

In various instances of the aforementioned embodiments, the non-transient computer readable medium further has stored therein instructions that when executed by the processing resource cause the processing resource to: monitor ongoing network traffic to yield a plurality of individual network traffics; and extract the four dimensional network session definition from one of the plurality of individual network traffics. In some instances of the aforementioned embodiments, the non-transient computer readable medium further has stored therein instructions that when executed by the processing resource cause the processing resource to: monitor ongoing network traffic to yield a plurality of individual network traffics; extract a plurality of four dimensional network session definitions each corresponding to a respective one of the plurality of individual network traffics; classify at least one of the plurality of four dimensional network session definitions to yield the previously classified four dimensional network session definition. In some such instances, the non-transient computer readable medium further has stored therein instructions that when executed by the processing resource cause the processing resource to: receive a plurality of four dimensional network session definitions and corresponding classifications from a third party service; and combine the plurality of four dimensional network session definitions received from the third party service with the previously classified four dimensional network session definition to yield the set of four dimensional network session definition matches and corresponding classifications.

In various instances of the aforementioned embodiments, the non-transient computer readable medium further has stored therein instructions that when executed by the processing resource cause the processing resource to receive a plurality of four dimensional network session definitions and corresponding classifications. In some instances of the aforementioned embodiments, the processing resource is included in a network security appliance deployed to provide network security services for a communication network. In various instances of the aforementioned embodiments, the process is selected from a group consisting of: blocking the network transaction, and allowing the network transaction.

Turning to FIG. 1A, network architecture 100 is shown that includes a four dimensional network session authorization control application 112 including dynamic four dimensional definition control in accordance with some embodiments. In the context of network architecture 100, a number of network elements (e.g., a network element 116a, a network element 116b, a network element 116c, a network element 116d, a network element 126a, a network element 126b, and a network element 126c) are coupled to respective networks (e.g., a local network 114 and a communication network 105). Local network 114 and communication network 105 may respectively be any type of communication network known in the art. Those skilled in the art will appreciate that, local network 114 and/or communication network 105 can be wireless network, a wired network, or a combination thereof that can be implemented as one of the various types of networks, such as an Intranet, a Local Area Network (LAN), a Wide Area Network (WAN), an Internet, and the like. Further, local network 114 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

Access to local network 114 is controlled by a network security appliance 110. Network security appliance 110 is coupled to a computer readable storage medium having stored thereon four dimensional network session authorization control application 112. Four dimensional network session authorization control application 112, when executed by one or more processors included in network security appliance 110, provides at least three functions. The first function is that of monitoring network traffic and based upon that network traffic defining a local four dimensional network session authorization policy. The network traffic includes, for example, a request from network element 116d to network element 126c passing via communication network 105 and network security appliance 110. As another example, such network traffic may include a request from network element 126a to network element 116b passing via communication network 105 and network security appliance 110. Each of the network sessions involve a variety of information including: the source, the destination, the port and the protocol. Thus, for example, network traffic between network element 116c and network element 126b may indicate network element 116c as the source, network element 126b as the destination, a port on network element 126b that is to be used, and a protocol that will be used to pass information between network element 116c and network element 126b. The aforementioned information defines the network session between network element 116c and network element 126b. Based upon the disclosure provided herein, one of ordinary skill in the art will recognize a variety of sources and destinations in a given architecture that may be used in a respective network session. Further, based upon the disclosure provided herein, one of ordinary skill in the art will recognize a variety of ports and protocols that may be used to perform network communications between respective sources and destinations.

The second function provided by four dimensional network session authorization control application 112 being executed by a processor of network security appliance 110 is incorporating received third party four dimensional policy with the local four dimensional network session authorization policy to yield an overall four dimensional network session authorization policy. This allows for network security appliance 110 to be dynamically updated with intelligence gathered by other network security devices and/or third party services about the malicious of benign nature of various four dimensional network session patterns.

The third function is enforcing the aforementioned overall four dimensional network session authorization policy. By enforcing the aforementioned overall four dimensional network session authorization policy network security appliance 110 is capable of providing network security without manual intervention by a system administrator. In some cases, however, a novel or unclassified four dimensional network session pattern may be encountered. In such a situation, rules may be applied to deal with such a situation. Such rules may include, but are not limited to, requesting permission from a network administrator, always allowing the network session, always disallowing the network session until a defined volume of the network session pattern has been seen. Based upon the disclosure provided herein, one of ordinary skill in the art will recognize a variety of rules that may be applied to network session patterns that have not been previously classified as automatically allowed or disallowed.

Figure 1B:
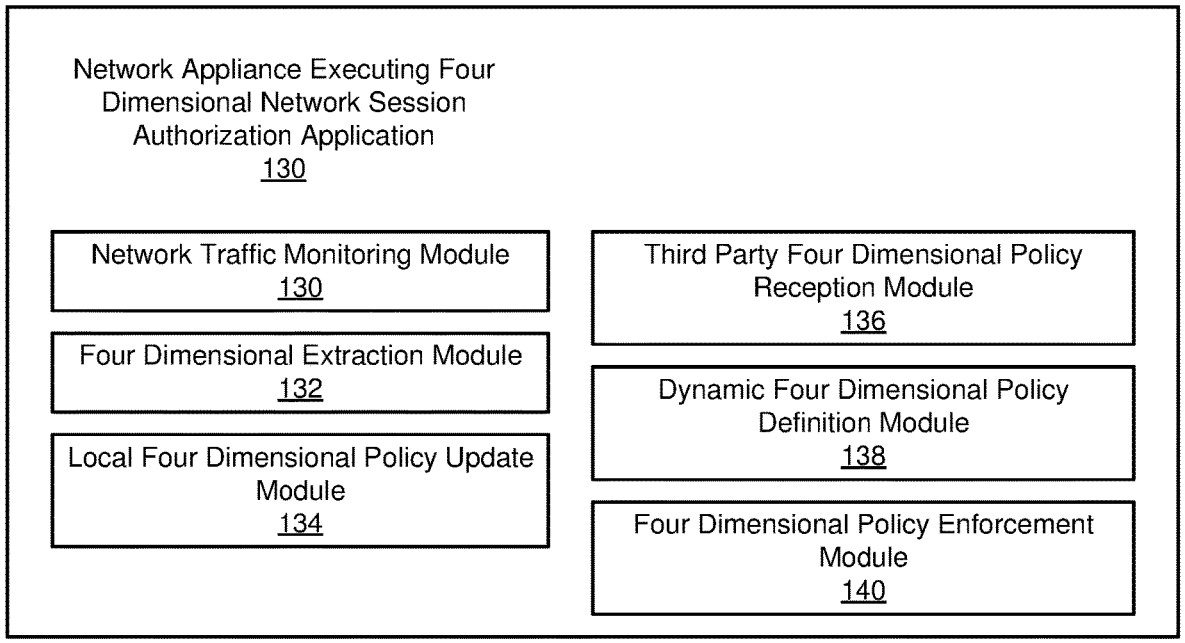

Turning to FIG. 1B, an example implementation of a network appliance executing four dimensional network session authorization control application 130 (e.g., network security appliance 110 executing four dimensional network session authorization control application 112) is shown in accordance with some embodiments. As shown in this example, network appliance executing four dimensional network session authorization control application 130 includes: a network traffic monitoring module 130, a four dimensional extraction module 132, a local four dimensional policy update module 134, a third party four dimensional policy reception module 136, a dynamic four dimensional policy definition module 138, and a four dimensional policy enforcement module 140.

Network traffic monitoring module 130 is configured to monitor ongoing network traffic. Such network traffic includes communications to/from various nodes on a network. As an example, where the method is being implemented by a network security appliance, the monitoring of network traffic includes monitoring of all network traffic that is visible to the network security appliance. The monitored network traffic is that directed between nodes communicating over a communication network.

Four dimensional extraction module 132 is configured to extract four dimensional information from the monitored network traffic available from network traffic monitoring module 130. The monitored network traffic includes a variety of information that together define a network session. Four elements of the monitored network traffic are incorporated together to form a four dimensional network session definition for the particular network session. In some embodiments, the four elements of the monitored network traffic are: an indication of the source of the communication, an indication of the destination to receive the communication, an indication of a port to be used for the communication, and an indication of the protocol to be used for the communication in that order. In such embodiments, the indication of the source of the communication, the indication of the destination to receive the communication, the indication of a port to be used for the communication, and the indication of the protocol to be used for the communication are the four dimensional information that is extracted from the monitored network traffic. This four dimensional information is passed to both local four dimensional policy update module 134 and four dimensional policy enforcement module 140.

Local four dimensional policy update module 134 is configured to determine whether the four dimensional network session definition has been previously detected. It is common for some network sessions to be repeated many times. For example, the network session may be for a server supporting ticket sales to access a database maintained within a secured network protected by a network security appliance. Such accesses will use the same port and communication protocol. In such an example it is conceivable that the same four dimensional network session definition may be seen hundreds of thousands and even millions of times a day. In such a case, the four dimensional network session definition will most likely have been previously identified. As another example, an unauthorized access to the same database by a hacker using a source device different from the aforementioned server supporting ticket sales is likely to be the first time the four dimensional network session definition because of a change in the source, and possibly even a change in the protocol or port information. As yet another example, even where a hacker has illegitimately accessed the aforementioned server supporting ticket sales and forms a request from such server such that the source matches that in a previously identified four dimensional network session definition, it is possible that it will still be the first time the four dimensional network session definition derived from the monitored network traffic will be novel as one or both of the port and/or protocol may not match. As yet a further example, the recently monitored network traffic may have a novel four dimensional network session definition and yet be allowable.

In the situation where it is the first time the four dimensional network session definition for the monitored network traffic has been identified, local four dimensional policy update module 134 logs an instance including the particular four dimensional network session definition. Alternatively, where the four dimensional network session definition has been previously encountered, local four dimensional policy update module 134 determines whether the four dimensional network session definition was previously identified as prohibited or allowed. Where the four dimensional network session definition was neither previously identified as prohibited or allowed, local four dimensional policy update module 134 determines whether the four dimensional network session definition has been seen more than a threshold number of times. Legitimate network accesses often repeat a number of times without being identified as prohibited. As such, a high number of repeats of the four dimensional network session definition is indicative of an allowed behavior. The threshold number of times may be, for example, one thousand or more and may be user programmable. Based upon the disclosure provided herein, one of ordinary skill in the art will recognize a variety of values that may be used for the threshold number depending upon the particular embodiment.

Where the four dimensional network session definition has been seen more than the threshold number of times, local four dimensional policy update module 134 identifies the four dimensional network session definition as allowed. Such identification as allowed assures that when the four dimensional network session definition is seen again by an enforcement module, the corresponding network session will be allowed.

Third party four dimensional policy reception module 136 is configured to receive four dimensional network session definition along with their classifications as either being allowed or prohibited. These may be received, for example, from other network security appliances operating in a network security fabric or from a third party service that aggregates and distributes information about malicious and/or non-malicious network traffic. Based upon the disclosure provided herein, one of ordinary skill in the art will recognize a variety of source of four dimensional network session definitions and corresponding classifications that may be used in relation to different embodiments.

Dynamic four dimensional policy definition module 138 is configured to assemble four dimensional network session definition along with their classifications as received from either both of local four dimensional policy update module 134 and third party four dimensional policy reception module 136 into a set of classified four dimensional network session definitions. This set of four dimensional network session definitions is used by four dimensional policy enforcement module 140 for comparison with recently received four dimensional network session definitions.

Four dimensional policy enforcement module 140 is configured to receive a four dimensional network session definition extracted from a monitored network traffic. Four dimensional policy enforcement module 140 determines whether the four dimensional network session definition has been identified as prohibited, and if it has been prohibited the network session corresponding to the four dimensional network session definition is blocked.

Alternatively, if the four dimensional network session definition has not been identified as prohibited, but rather has been identified as allowed, four dimensional policy enforcement module 140 allows the network session corresponding to the four dimensional network session definition.

Where the four dimensional network session definition has neither been identified as allowed or prohibited, it is considered ambiguous. In such a case, four dimensional policy enforcement module 140 applies ambiguous processing. Such ambiguous processing may be any processing applied to determining whether to allow or disallow a network session corresponding to a four dimensional network session definition that has not already been identified as automatically allowed or automatically blocked. As an example, in an highly secured network any network session corresponding to a four dimensional network session definition that has not already been identified as automatically allowed or automatically blocked may be blocked and remain blocked until the four dimensional network session definition has been repeated enough times to cause an alert to be sent to a human administrator who can manually allow the network session. As another example, in less secured network any network session corresponding to a four dimensional network session definition that has not already been identified as automatically allowed or automatically blocked may be allowed and remain allowed until the four dimensional network session definition is identified as prohibited based either on a network administrator identifying it as prohibited or upon receipt from a third party service that identified it as prohibited. Based upon the disclosure provided herein, one of ordinary skill in the at will recognize a variety of approaches that may be used to carry out enforcement for network sessions corresponding to a four dimensional network session definitions that have not already been identified as automatically allowed or automatically blocked.

Figure 1C:
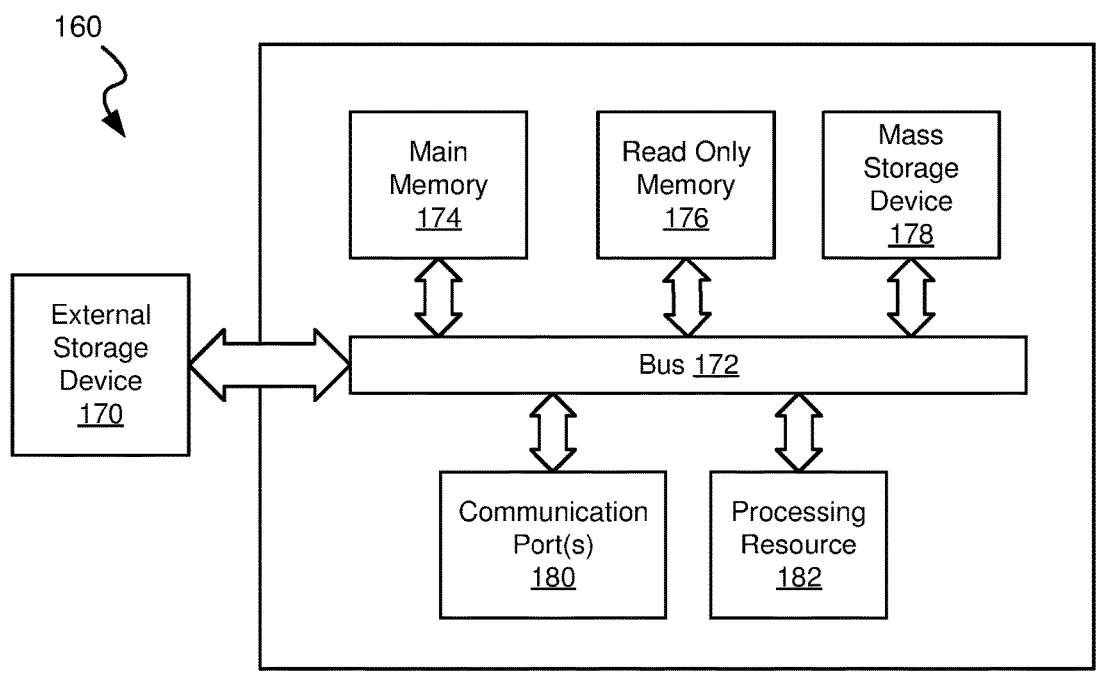

Turning to FIG. 1C, an example computer system 160 is shown in which or with which embodiments of the present disclosure may be utilized. As shown in FIG. 1C, computer system 160 includes an external storage device 170, a bus 172, a main memory 174, a read-only memory 176, a mass storage device 178, one or more communication ports 180, and one or more processing resources (e.g., processing circuitry 182). In one embodiment, computer system 160 may represent some portion of network elements 116, 126, and/or network security appliances 110, 120.

Those skilled in the art will appreciate that computer system 160 may include more than one processing resource 182 and communication port 180. Non-limiting examples of processing resources include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processors 182 may include various modules associated with embodiments of the present disclosure.

Communication port 180 can be any of an RS-232 port for use with a modem-based dialup connection, a 10/100 Ethernet port, a Gigabit, 10 Gigabit, 25G, 40G, and 100G port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g., start-up or BIOS instructions for the processing resource.

Mass storage 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such as front side bus (FSB), which connects processing resources to software systems.

Optionally, operator and administrative interfaces, e.g., a display, keyboard, and a cursor control device, may also be coupled to bus 172 to support direct operator interaction with the computer system. Other operator and administrative interfaces can be provided through network connections connected through communication port 180. External storage device 190 can be any kind of external hard-drives, floppy drives, IOMEGA® Zip Drives, Compact Disc-Read Only Memory (CD-ROM), Compact Disc-Rewritable (CD-RW), Digital Video Disk-Read Only Memory (DVD-ROM). Components described above are meant only to show various possibilities. In no way should the aforementioned example computer systems limit the scope of the present disclosure.

Figure 2A:
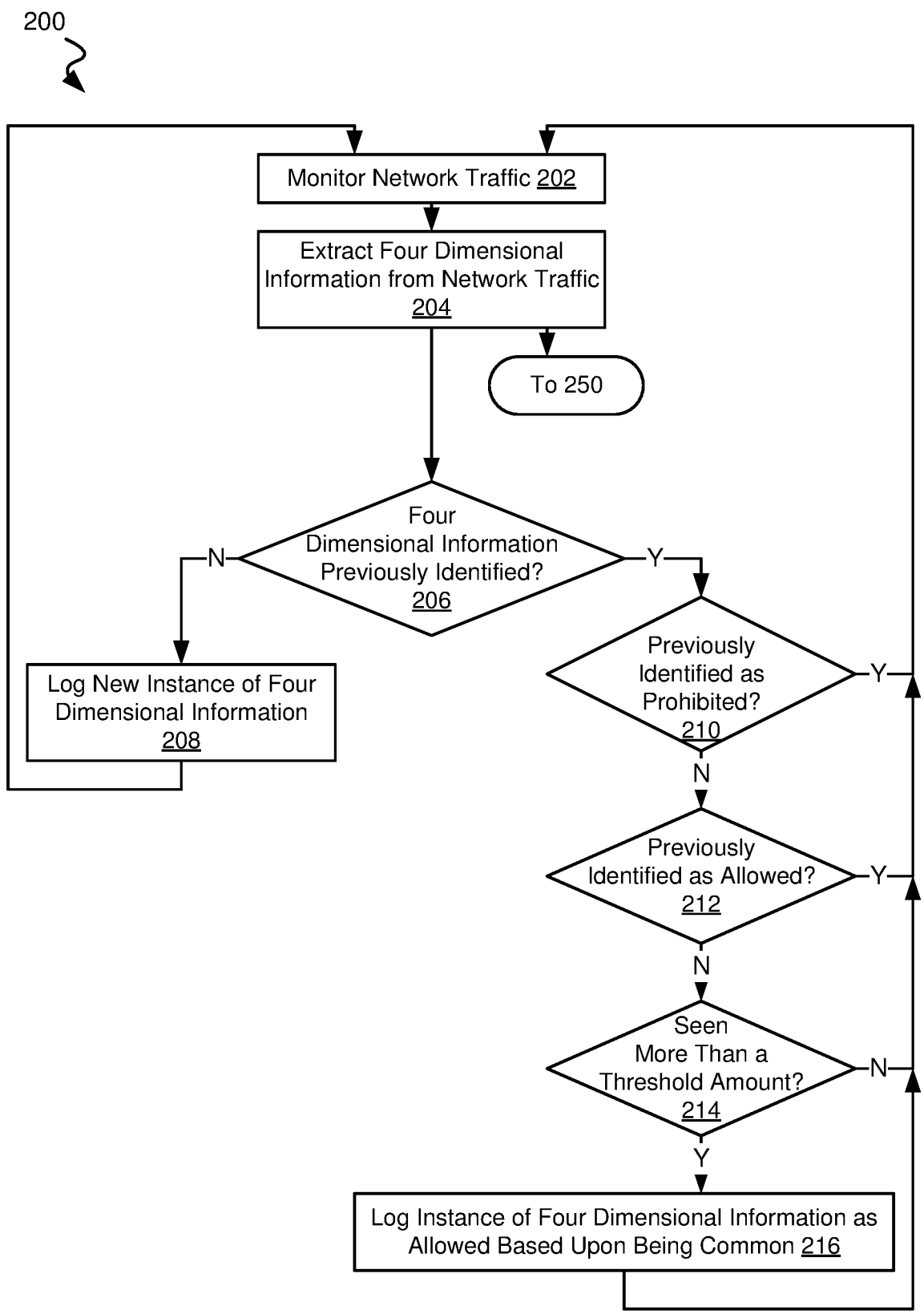
FIGS. 2A-2B are flow diagrams showing a method in accordance with some embodiments for defining and enforcing four dimensional network session authorization.

Turning to FIG. 2A, a flow diagram 200 shows a method in accordance with some embodiments for defining four dimensional network session authorization. Following flow diagram 200, network traffic is monitored (block 202). As an example, where the method is being implemented by a network security appliance, the monitoring of network traffic includes monitoring of all network traffic that is visible to the network security appliance. The monitored network traffic is that directed between nodes communicating over a communication network. Four dimensional information is extracted from the monitored network traffic (block 204). The monitored network traffic includes a variety of information that together define a network session. Four elements of the monitored network traffic are incorporated together to form a four dimensional network session definition for the particular network session. In some embodiments, the four elements of the monitored network traffic are: an indication of the source of the communication, an indication of the destination to receive the communication, an indication of a port to be used for the communication, and an indication of the protocol to be used for the communication in that order. In such embodiments, the indication of the source of the communication, the indication of the destination to receive the communication, the indication of a port to be used for the communication, and the indication of the protocol to be used for the communication are the four dimensional information that is extracted from the monitored network traffic. This four dimensional information is passed to an enforcement process (block 250) that is described below in relation to FIG. 2B.

Additionally, it is determined whether the four dimensional network session definition has been previously detected (block 206). It is common for some network sessions to be repeated many times. For example, the network session may be for a server supporting ticket sales to access a database maintained within a secured network protected by a network security appliance. Such accesses will use the same port and communication protocol. In such an example it is conceivable that the same four dimensional network session definition may be seen hundreds of thousands and even millions of times a day. In such a case, the four dimensional network session definition will most likely have been previously identified (block 206). As another example, an unauthorized access to the same database by a hacker using a source device different from the aforementioned server supporting ticket sales is likely to be the first time the four dimensional network session definition because of a change in the source, and possibly even a change in the protocol or port information. As yet another example, even where a hacker has illegitimately accessed the aforementioned server supporting ticket sales and forms a request from such server such that the source matches that in a previously identified four dimensional network session definition, it is possible that it will still be the first time the four dimensional network session definition derived from the monitored network traffic will be novel as one or both of the port and/or protocol may not match. As yet a further example, the recently monitored network traffic may have a novel four dimensional network session definition and yet be allowable. In the situation where it is the first time the four dimensional network session definition for the monitored network traffic has been identified, an instance including the particular four dimensional network session definition is logged (block 208) and the process ends.

Alternatively, where the four dimensional network session definition has been previously encountered (block 206), it is determined whether the four dimensional network session definition was previously identified as prohibited (block 210). Where the four dimensional network session definition was previously identified as prohibited (block 210), the process ends. Alternatively, where the four dimensional network session definition was not previously identified as prohibited (block 210), it is determined whether the four dimensional network session definition was previously identified as allowed (block 212). Where the four dimensional network session definition was previously identified as allowed (block 212), the process ends.

Alternatively, where the four dimensional network session definition was neither previously identified as prohibited (block 210) or allowed (block 212), it is determined whether the four dimensional network session definition has been seen more than a threshold number of times (block 214). Legitimate network accesses often repeat a number of times without being identified as prohibited. As such, a high number of repeats of the four dimensional network session definition is indicative of an allowed behavior. The threshold number of times may be, for example, one thousand or more and may be user programmable. Based upon the disclosure provided herein, one of ordinary skill in the art will recognize a variety of values that may be used for the threshold number depending upon the particular embodiment.

Where the four dimensional network session definition has been seen more than the threshold number of times (block 214), the four dimensional network session definition is identified as allowed (block 216). Such identification as allowed assures that when the four dimensional network session definition is seen again by an enforcement module, the corresponding network session will be allowed.

Figure 2B:
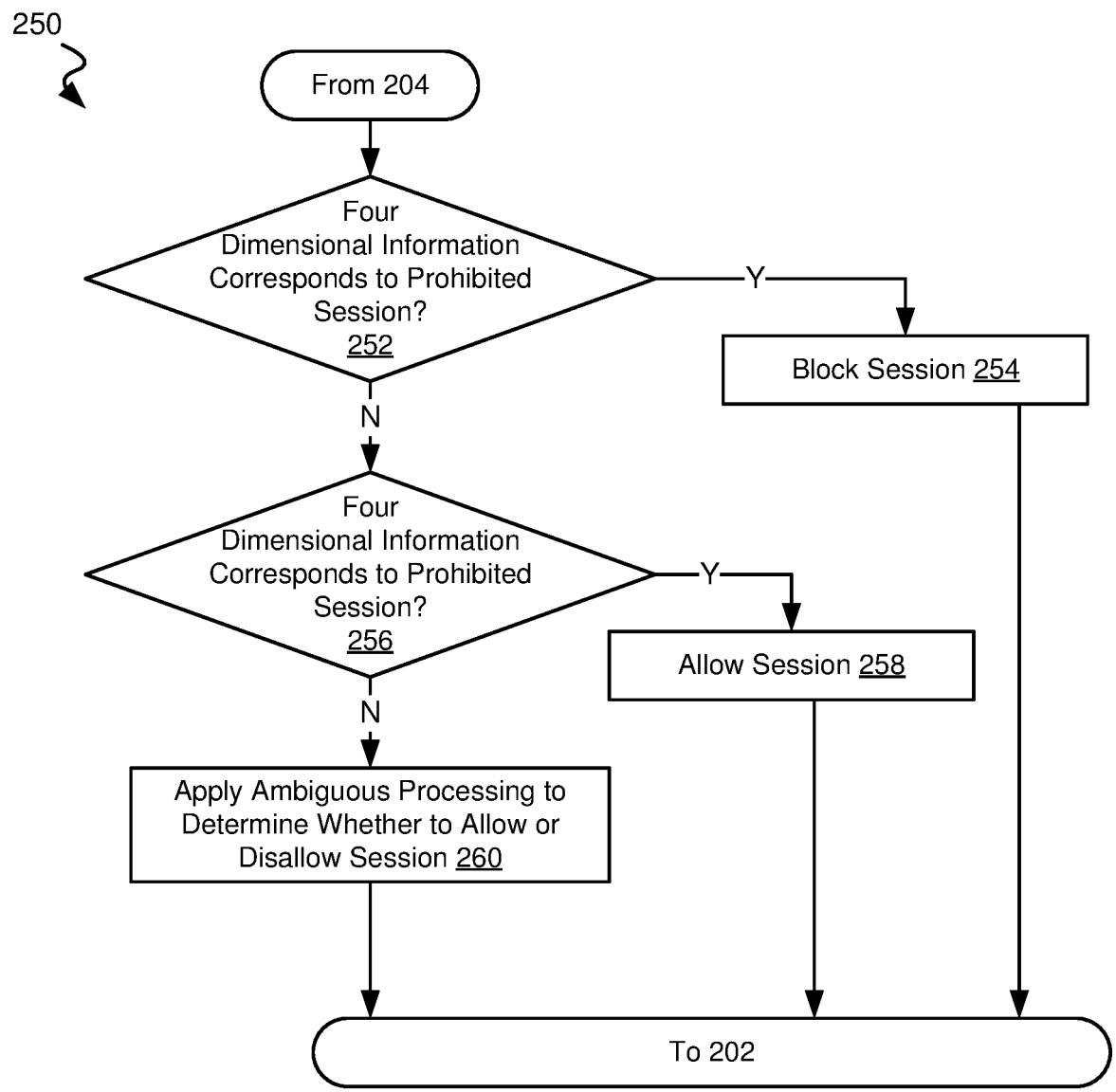

Turning to FIG. 2B, a flow diagram 250 shows a method in accordance with some embodiments for enforcing four dimensional network session authorization. Following flow diagram 250, a four dimensional network session definition extracted from a monitored network traffic is received from block 204 of flow diagram 200. It is determined whether the four dimensional network session definition has been identified as prohibited (block 252). Where the four dimensional network session definition has been identified as prohibited (block 252), the network session corresponding to the four dimensional network session definition is blocked (block 254).

Alternatively, where the four dimensional network session definition has not been identified as prohibited (block 252), it is determined whether the four dimensional network session definition has been identified as allowed (block 256). Where the four dimensional network session definition has been identified as allowed (block 256), the network session corresponding to the four dimensional network session definition is allowed (block 258).

Alternatively, where the four dimensional network session definition has not been identified as either prohibited (block 252) or allowed (block 256), ambiguous processing is applied to determine whether to allow or block the network session corresponding to the four dimensional network session definition (block 260). Such ambiguous processing may be any processing applied to determining whether to allow or disallow a network session corresponding to a four dimensional network session definition that has not already been identified as automatically allowed or automatically blocked. As an example, in an highly secured network any network session corresponding to a four dimensional network session definition that has not already been identified as automatically allowed or automatically blocked may be blocked and remain blocked until the four dimensional network session definition has been repeated enough times to cause an alert to be sent to a human administrator who can manually allow the network session. As another example, in less secured network any network session corresponding to a four dimensional network session definition that has not already been identified as automatically allowed or automatically blocked may be allowed and remain allowed until the four dimensional network session definition is identified as prohibited based either on a network administrator identifying it as prohibited or upon receipt from a third party service that identified it as prohibited. Based upon the disclosure provided herein, one of ordinary skill in the at will recognize a variety of approaches that may be used to carry out enforcement for network sessions corresponding to a four dimensional network session definitions that have not already been identified as automatically allowed or automatically blocked.

In conclusion, the present invention provides for novel systems, devices, and methods. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for automatically applying network communication policies, the method comprising:
   receiving, by a processing resource, a four dimensional network session definition representing a network transaction;
   determining, by the processing resource, if the four dimensional network session definition matches a previously classified four dimensional network session definition included in a set of four dimensional network session definition matches and corresponding classifications, wherein the previously classified four dimensional network session definition does not indicate a process to be applied to the present network transaction;
   responsive to that the four dimensional network session definition does not match a previously classified four dimensional network session, indicating a process to be applied to the network transaction allowing the set of four dimensional network session based on a number of previous accesses; and
   applying the process to the network transaction.

2. The method of claim 1, wherein the four dimensional network session definition includes: a source, a destination, a port, and a protocol.

3. The method of claim 1, wherein the four dimensional network session definition includes: a source, a destination, a port, and a protocol in order of the source, the destination, the port, and the protocol.

4. The method of claim 1, wherein the method further comprises:
   monitoring, by the processing resource, ongoing network traffic to yield a plurality of individual network traffics; and
   extracting, by the processing resource, the four dimensional network session definition from one of the plurality of individual network traffics.

5. The method of claim 1, wherein the method further comprises:
   monitoring, by the processing resource, ongoing network traffic to yield a plurality of individual network traffics;
   extracting, by the processing resource, a plurality of four dimensional network session definitions each corresponding to a respective one of the plurality of individual network traffics;
   classifying, by the processing resource, at least one of the plurality of four dimensional network session definitions to yield the previously classified four dimensional network session definition.

6. The method of claim 5, wherein the method further comprises:
   receiving, by the processing resource, a plurality of four dimensional network session definitions and corresponding classifications from a third party service; and
   combining, by the processing resource, the plurality of four dimensional network session definitions received from the third party service with the previously classified four dimensional network session definition to yield the set of four dimensional network session definition matches and corresponding classifications.

7. The method of claim 1, wherein the method further comprises:
   receiving, by the processing resource, a plurality of four dimensional network session definitions and corresponding classifications.

8. The method of claim 1, wherein the processing resource is included in a network security appliance deployed to provide network security services for a communication network.

9. The method of claim 1, wherein the process is selected from a group consisting of: blocking the network transaction, and allowing the network transaction.

10. A system for automatically applying network communication policies, the system comprising:
    a processing resource;
    a non-transient computer readable medium coupled to the processing resource and having stored therein instructions that when executed by the processing resource cause the processing resource to:
    receive a four dimensional network session definition representing a network transaction;
    determine that the four dimensional network session definition matches a previously classified four dimensional network session definition included in a set of four dimensional network session definition matches and corresponding classifications, wherein the previously classified four dimensional network session definition does not indicate a process to be applied to the present network transaction;
    responsive to that the four dimensional network session definition does not match a previously classified four dimensional network session, indicate a process to be applied to the network transaction allowing the set of four dimensional network session based on a number of previous accesses; and apply the process to the network transaction.

11. The system of claim 10, wherein the four dimensional network session definition includes: a source, a destination, a port, and a protocol.

12. The system of claim 10, wherein the four dimensional network session definition includes: a source, a destination, a port, and a protocol in order of the source, the destination, the port, and the protocol.

13. The system of claim 10, wherein the non-transient computer readable medium further having stored therein instructions that when executed by the processing resource cause the processing resource to:

monitor ongoing network traffic to yield a plurality of individual network traffics; and extract the four dimensional network session definition from one of the plurality of individual network traffics.

14. The system of claim 10, wherein the non-transient computer readable medium further having stored therein instructions that when executed by the processing resource cause the processing resource to:

monitor ongoing network traffic to yield a plurality of individual network traffics;

extract a plurality of four dimensional network session definitions each corresponding to a respective one of the plurality of individual network traffics;

classify at least one of the plurality of four dimensional network session definitions to yield the previously classified four dimensional network session definition.

15. The system of claim 14, wherein the non-transient computer readable medium further having stored therein instructions that when executed by the processing resource cause the processing resource to:

receive a plurality of four dimensional network session definitions and corresponding classifications from a third party service; and combine the plurality of four dimensional network session definitions received from the third party service with the previously classified four dimensional network session definition to yield the set of four dimensional network session definition matches and corresponding classifications.

16. The system of claim 10, wherein the non-transient computer readable medium further having stored therein instructions that when executed by the processing resource cause the processing resource to:

receive a plurality of four dimensional network session definitions and corresponding classifications.

17. The system of claim 10, wherein the processing resource is included in a network security appliance deployed to provide network security services for a communication network.

18. The system of claim 10, wherein the process is selected from a group consisting of: blocking the network transaction, and allowing the network transaction.

19. A non-transitory computer readable medium having stored therein instructions that when executed by the processing resource cause the processing resource to:

receive a four dimensional network session definition representing a network transaction;

determine that the four dimensional network session definition matches a previously classified four dimensional network session definition included in a set of four dimensional network session definition matches and corresponding classifications, wherein the previously classified four dimensional network session definition does not indicate a process to be applied to the present network transaction;

responsive to that the four dimensional network session definition does not match a previously classified four dimensional network session, indicating a process to be applied to the network transaction allowing the set of four dimensional network session based on a number of previous accesses; and apply the process to the network transaction.

20. A non-transitory computer readable medium of claim 19, wherein the four dimensional network session definition includes: a source, a destination, a port, and a protocol; and wherein the process is selected from a group consisting of: blocking the network transaction, and allowing the network transaction.

* * * * *